(12) United States Patent
Cavagnaro et al.

(10) Patent No.: US 11,732,601 B2
(45) Date of Patent: Aug. 22, 2023

(54) VARIABLE TURBINE GEOMETRY ASSEMBLY

(71) Applicant: BorgWarner Inc., Auburn Hills, MI (US)

(72) Inventors: Augustine Cavagnaro, Flat Rock, NC (US); Elias Morgan, Leicester, NC (US); Greg Williams, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/542,791

(22) Filed: Dec. 6, 2021

(65) Prior Publication Data

US 2023/0175414 A1 Jun. 8, 2023

(51) Int. Cl.
*F01D 17/16* (2006.01)
*F02B 39/00* (2006.01)

(52) U.S. Cl.
CPC .............. *F01D 17/16* (2013.01); *F02B 39/00* (2013.01); *F05D 2220/40* (2013.01)

(58) Field of Classification Search
CPC ....... F01D 17/16; F02B 39/00; F05D 2220/40
USPC ...................................................... 60/605.1
See application file for complete search history.

(56) References Cited

U.S. PATENT DOCUMENTS

| | | | |
|---|---|---|---|
| 4,984,965 | A | 1/1991 | McKean |
| 6,932,565 | B2 | 8/2005 | Garrett et al. |
| 7,329,090 | B2 | 2/2008 | Schlienger et al. |
| 7,824,152 | B2 | 11/2010 | Morrison |
| 8,061,976 | B2 | 11/2011 | Hall |
| 8,500,395 | B2 | 8/2013 | Roby et al. |
| 8,684,678 | B2 | 4/2014 | Fleig et al. |

(Continued)

FOREIGN PATENT DOCUMENTS

| | | |
|---|---|---|
| CN | 103104299 B | 7/2015 |
| DE | 10 2018 212 257 A1 | 1/2020 |

(Continued)

OTHER PUBLICATIONS

English language abstract and machine-assisted English translation for CN 103104299 B extracted from espacenet.com database on Dec. 8, 2021, 8 pages.

(Continued)

*Primary Examiner* — J. Todd Newton
(74) *Attorney, Agent, or Firm* — Howard & Howard Attorneys PLLC

(57) ABSTRACT

A variable turbine geometry assembly includes an adjustment ring extending along and rotatable about an axis, at least one vane lever coupled to the adjustment ring, and at least one vane coupled to the at least one vane lever. The variable turbine geometry assembly also includes a biasing member coupled to the adjustment ring at a first circumferential location on the adjustment ring and coupled to the adjustment ring at a second circumferential location on the adjustment ring. The biasing member extends from the first circumferential location to the second circumferential location. The biasing member is operably in contact with the at least one vane lever between the first circumferential location and the second circumferential location to bias the at least one vane lever toward the adjustment ring and to reduce vibration between the adjustment ring and the at least one vane lever.

15 Claims, 3 Drawing Sheets

(56) References Cited

U.S. PATENT DOCUMENTS

| | | |
|---|---|---|
| 9,163,557 B2 | 10/2015 | Blummel et al. |
| 9,388,707 B2 | 7/2016 | Martinez-Botas et al. |
| 9,518,589 B2 | 12/2016 | Ward |
| 9,726,081 B2 | 8/2017 | Zahoransky et al. |
| 10,253,683 B2 | 4/2019 | Musil et al. |
| 10,364,697 B2 | 7/2019 | King et al. |
| 10,378,434 B2 | 8/2019 | Morgan et al. |
| 10,385,722 B2 | 8/2019 | Kennedy |
| 2010/0166541 A1 | 7/2010 | Hausser et al. |
| 2010/0232937 A1 | 9/2010 | Wengert et al. |
| 2010/0293942 A1 | 11/2010 | Martinez-Botas |
| 2012/0237343 A1* | 9/2012 | Matsuyama ............. F02C 7/28 415/182.1 |
| 2015/0118038 A1 | 4/2015 | Ward |
| 2016/0305274 A1 | 10/2016 | Kennedy |
| 2017/0234153 A1 | 8/2017 | Williams et al. |
| 2018/0112555 A1 | 4/2018 | Humhauser |
| 2020/0248578 A1* | 8/2020 | Ehrhard ................. F02B 37/00 |

FOREIGN PATENT DOCUMENTS

| | | |
|---|---|---|
| DE | 102018212257 A1 | 1/2020 |
| WO | 2015048238 A1 | 4/2015 |
| WO | 2015089350 A1 | 6/2015 |

OTHER PUBLICATIONS

Machine-assisted English language abstract and machine-assisted English translation for DE 10 2018 212 257 A extracted from espacenet.com database on Dec. 8, 2021, 10 pages.

\* cited by examiner

VARIABLE TURBINE GEOMETRY ASSEMBLY

BACKGROUND OF THE INVENTION

1. Field of the Invention

The invention generally relates to a variable turbine geometry assembly for controlling flow of exhaust gas to a turbine wheel of a turbocharger.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use with a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed in the turbine housing interior for receiving exhaust gas from the internal combustion engine, and a shaft coupled to and rotatable by the turbine wheel. Typical turbochargers also include a compressor housing defining a compressor housing interior, and a compressor wheel disposed in the compressor housing interior and coupled to the shaft, with the compressor wheel being rotatable by the shaft for delivering compressed air to the internal combustion engine. Specifically, energy from the exhaust gas from the internal combustion engine, which would normally be wasted energy, is used to rotatably drive the turbine wheel, which is used to rotatably drive the shaft and, in turn, rotatably drive the compressor wheel to compress air and deliver compressed air to the internal combustion engine.

Commonly, turbochargers include a variable turbine geometry assembly disposed about the turbine wheel. Variable turbine geometry assemblies are known to control flow of exhaust gas to the turbine wheel of the turbocharger. However, variable turbine geometry assemblies known in the art are subject to failure due to repeated wear on various components of the variable turbine geometry assembly caused by vibrations between the various components of the variable turbine geometry assembly. Wear on components of the variable turbine geometry assembly caused by vibrations between various components of the variable turbine geometry assembly can result in increased noise, even further increased vibrations, and increased harshness (NVH) of the turbocharger. Moreover, wear on components can also result in functional failure of the variable turbine geometry assembly, resulting in the variable turbine geometry assembly failing to adequately control flow of exhaust gas to the turbine wheel of the turbocharger.

As such, there remains a need for an improved variable turbine geometry assembly for a turbocharger.

SUMMARY OF THE INVENTION AND ADVANTAGES

A variable turbine geometry assembly for controlling flow of exhaust gas to a turbine wheel of a turbocharger includes an adjustment ring extending along and rotatable about an axis. The variable turbine geometry assembly also includes at least one vane lever coupled to the adjustment ring and at least one vane coupled to the at least one vane lever. The at least one vane is moveable with respect to the adjustment ring when the adjustment ring rotates about the axis. The variable turbine geometry assembly further includes a biasing member coupled to the adjustment ring at a first circumferential location on the adjustment ring, and coupled to the adjustment ring at a second circumferential location different from the first circumferential location on the adjustment ring. The biasing member extends from the first circumferential location on the adjustment ring to the second circumferential location on the adjustment ring. The biasing member is operably in contact with the at least one vane lever between the first circumferential location and the second circumferential location to bias the at least one vane lever toward the adjustment ring and to reduce vibration between the adjustment ring and the at least one vane lever.

Accordingly, having the biasing member operably in contact with the at least one vane lever to bias the at least one vane lever toward the adjustment ring and to reduce vibration between the adjustment ring and the at least one vane lever reduces wear between various components of the variable turbine geometry assembly. More specifically, reduced vibration between the adjustment ring and the at least one vane lever reduces wear on the adjustment ring and on the at least one vane lever. Reduced wear on the adjustment ring and the at least one vane lever further reduces noise, vibration, and harshness (NVH) of the turbocharger, as well as lowering the likelihood of functional failure of the variable turbine geometry assembly adequately controlling flow of exhaust gas to the turbine wheel of the turbocharger. Moreover, having the biasing member coupled to the first circumferential location and the second circumferential location, and operably in contact with the at least one vane lever between the first circumferential location and the second circumferential location, provides stability to the biasing member while achieving the advantages described above.

In another embodiment, a variable turbine geometry assembly for controlling flow of exhaust gas to a turbine wheel of a turbocharger includes an adjustment ring extending along and rotatable about an axis. The variable turbine geometry assembly also includes at least one vane lever coupled to the adjustment ring. The at least one vane lever has a first lever end coupled to the adjustment ring, a second lever end defining a pin aperture, an inner lever surface facing the adjustment ring and extending parallel to the adjustment ring, and an axial stop extending axially away from the inner lever surface toward the adjustment ring and configured to limit axial movement of the at least one vane lever. The variable turbine geometry assembly further includes a pin disposed in the pin aperture defined by the second lever end of the at least one lever. The variable turbine geometry assembly further includes at least one vane coupled to the pin, with the at least one vane moveable with respect to the adjustment ring when the adjustment ring rotates about the axis. The variable turbine geometry assembly further includes a biasing member coupled to the adjustment ring and operably in contact with the at least one vane lever to bias the at least one vane lever toward the adjustment ring and to reduce vibration between the adjustment ring and the at least one vane lever.

Accordingly, having the biasing member operably in contact with the at least one vane lever to bias the at least one vane lever toward the adjustment ring and to reduce vibration between the adjustment ring and the at least one vane lever reduces wear between various components of the variable turbine geometry assembly. More specifically, reduced vibration between the adjustment ring and the at least one vane lever reduces wear on the adjustment ring and on the at least one vane lever. Reduced wear on the adjustment ring and the at least one vane lever further reduces noise, vibration, and harshness (NVH) of the turbocharger, as well as lowering the likelihood of functional failure of the variable turbine geometry assembly adequately controlling flow of exhaust gas to the turbine wheel of the turbocharger. Moreover, the at least one vane lever including the axial stop extending axially away from the inner lever surface toward the adjustment ring and configured to limit axial movement of the at least one vane lever reduces relative distances between the at least one vane lever and the adjustment ring, allowing the biasing member to more easily reduce vibration, and thus wear, between the at least one vane lever and the adjustment ring.

In another embodiment, a variable turbine geometry assembly for controlling flow of exhaust gas to a turbine wheel of a turbocharger includes an adjustment ring extending along and rotatable about a first axis. The variable turbine geometry assembly also includes at least one vane lever coupled to the adjustment ring and at least one vane coupled to the at least one vane lever. The at least one vane is moveable with respect to the adjustment ring when the adjustment ring rotates about the first axis. The at least one vane has a first vane surface facing the first axis, and a second vane surface opposite the first vane surface and facing away from the first axis. The at least one vane further has a third vane surface facing the adjustment ring, and a fourth vane surface opposite the third vane surface and facing away from the adjustment ring. The first vane surface of the at least one vane has a discontinuous region. The discontinuous region extends along a second axis from a first region end to a second region end spaced from the first region end along the second axis. The second axis is obliquely angled relative to the first axis to impart an aerodynamic load to the at least one vane.

Accordingly, the aerodynamic load imparted on the at least one vane by the discontinuous region biases the at least one vane in a particular rotational direction to reduce flutter of the at least one vane. Reduced flutter of the at least one vane reduces vibration between the at least one vane and the at least one vane lever and the adjustment ring, which in turn reduces wear between various components of the variable turbine geometry assembly. More specifically, reduced vibration between the at least one vane and the at least one vane lever and the adjustment ring reduces wear on the at least one vane, the at least one vane lever, and the adjustment ring. Reduced wear on the at least one vane, the at least one vane lever, and the adjustment ring further reduces noise, vibration, and harshness (NVH) of the turbocharger, as well as lowering the likelihood of functional failure of the variable turbine geometry assembly adequately controlling flow of exhaust gas to the turbine wheel of the turbocharger.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
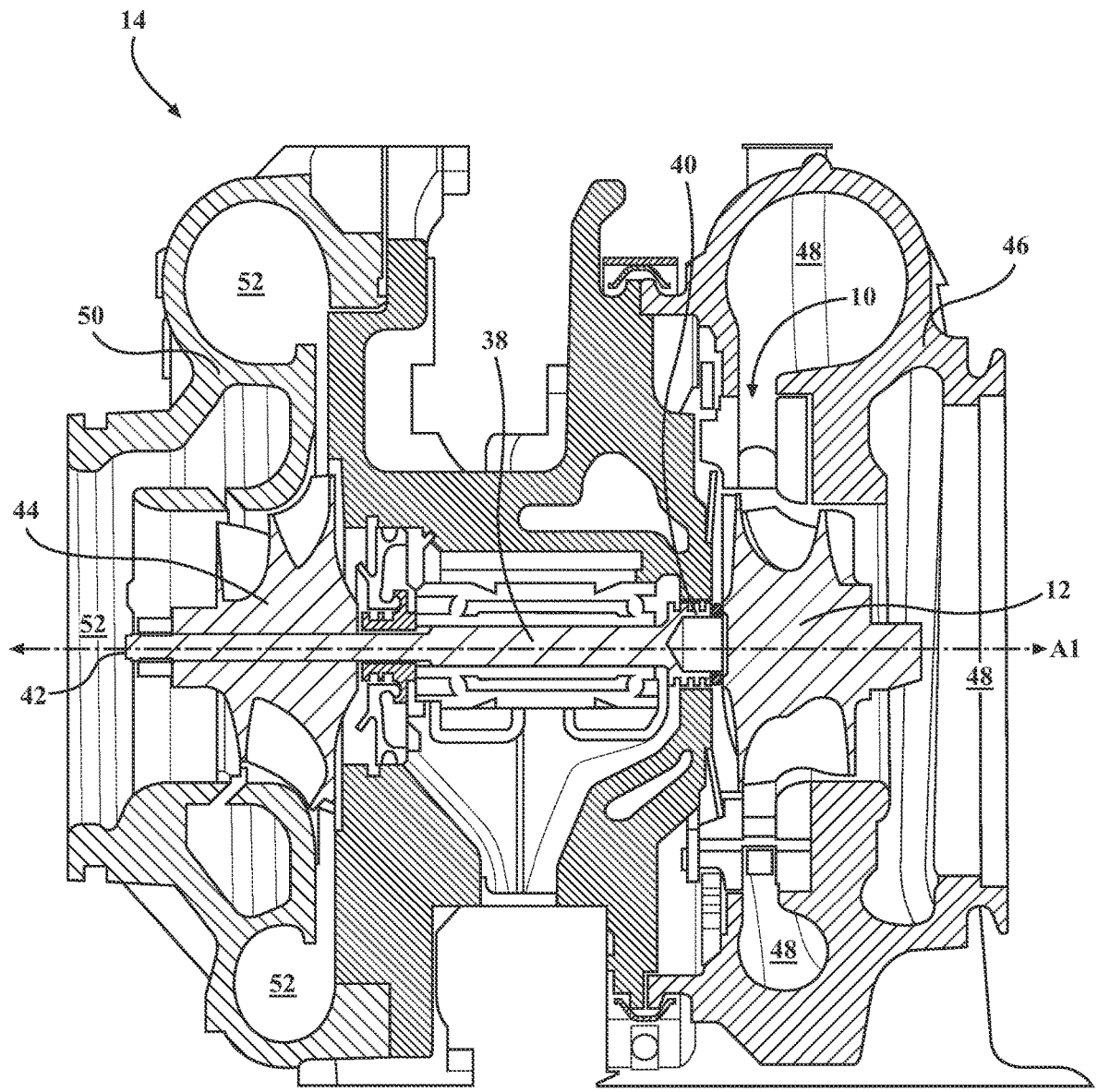
FIG. 1 is a cross-sectional view of a turbocharger including a turbine housing defining a turbine housing interior, a turbine wheel disposed in the turbine housing interior, a variable turbine geometry assembly disposed about the turbine wheel, a shaft rotatably coupled to the turbine wheel, a compressor housing defining a compressor housing interior, and a compressor wheel disposed in the compressor housing interior and rotatably coupled to the shaft.
Figure 2:
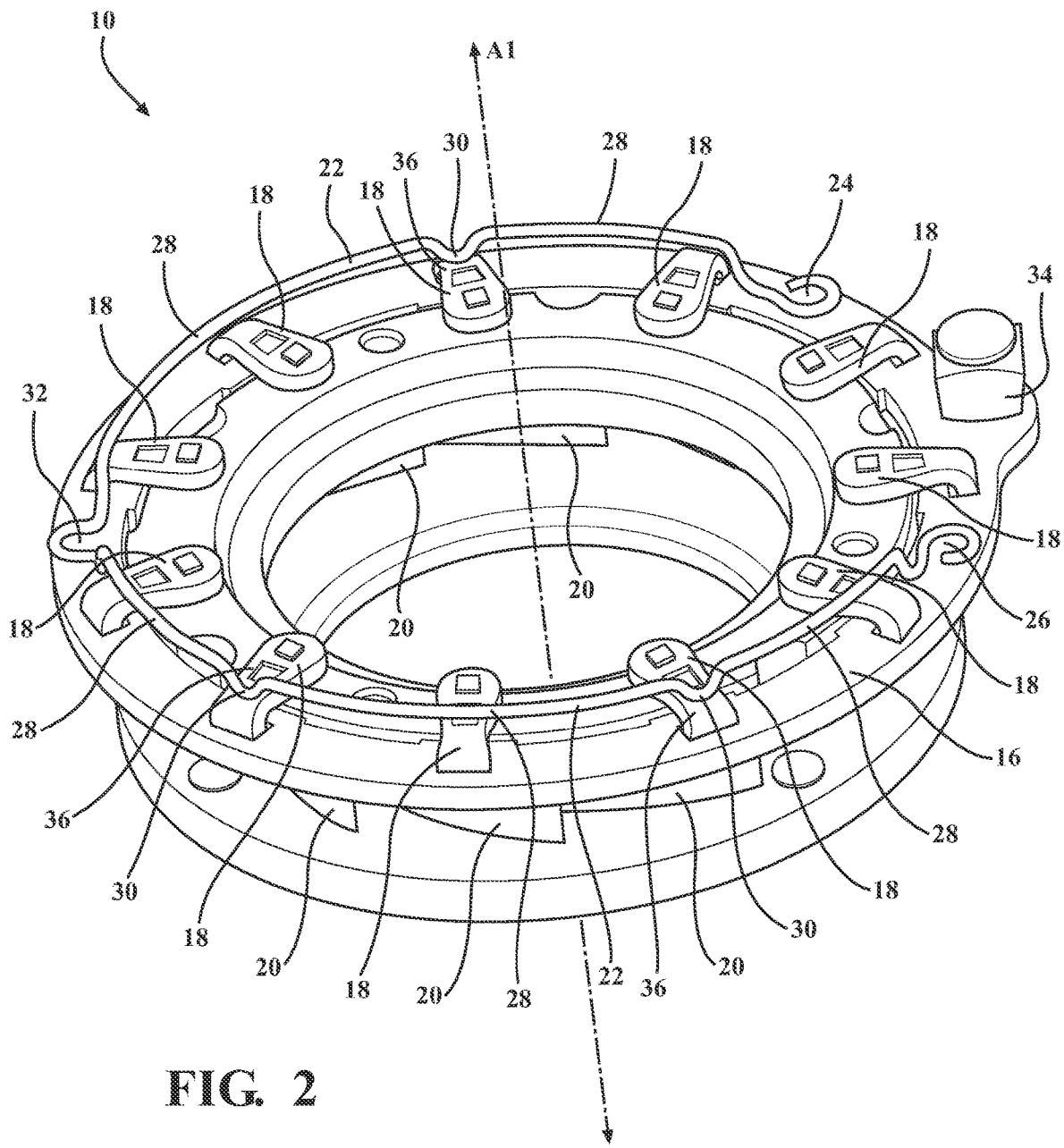
FIG. 2 is a perspective view of the variable turbine geometry assembly according to one embodiment, with the variable turbine geometry assembly including an adjustment ring, at least one vane lever, at least one vane, and a biasing member.

With reference to the Figures, wherein like numerals indicate like parts throughout the several views, a variable turbine geometry assembly 10 for controlling flow of exhaust gas to a turbine wheel 12 of a turbocharger 14 is shown in FIGS. 1 and 2. The variable turbine geometry assembly 10 includes an adjustment ring 16 extending along and rotatable about an axis A1. The variable turbine geometry assembly 10 also includes at least one vane lever 18 coupled to the adjustment ring 16, and the variable turbine geometry assembly 10 includes at least one vane 20 coupled to the at least one vane lever 18. The at least one vane 20 is moveable with respect to the adjustment ring 16 when the adjustment ring 16 rotates about the axis A1. The variable turbine geometry assembly 10 further includes a biasing member 22 coupled to the adjustment ring 16 at a first circumferential location 24 on the adjustment ring 16, and coupled to the adjustment ring 16 at a second circumferential location 26 different from the first circumferential location 24 on the adjustment ring 16. The biasing member 22 extends from the first circumferential location 24 on the adjustment ring 16 to the second circumferential location 26 on the adjustment ring 16. The biasing member 22 is operably in contact with the at least one vane lever 18 between the first circumferential location 24 and the second circumferential location 26 to bias the at least one vane lever 18 toward the adjustment ring 16 and to reduce vibration between the adjustment ring 16 and the at least one vane lever 18.

Accordingly, having the biasing member 22 operably in contact with the at least one vane lever 18 to bias the at least one vane lever 18 toward the adjustment ring 16 and to reduce vibration between the adjustment ring 16 and the at least one vane lever 18 reduces wear between various components of the variable turbine geometry assembly 10. More specifically, reduced vibration between the adjustment ring 16 and the at least one vane lever 18 reduces wear on the adjustment ring 16 and on the at least one vane lever 18. Reduced wear on the adjustment ring 16 and the at least one vane lever 18 further reduces noise, vibration, and harshness (NVH) of the turbocharger 14, as well as lowering the likelihood of functional failure of the variable turbine geometry assembly 10 adequately controlling flow of exhaust gas to the turbine wheel 12 of the turbocharger 14. Moreover, having the biasing member 22 coupled to the first circumferential location 24 and the second circumferential location 26, and operably in contact with the at least one vane lever 18 between the first circumferential location 24 and the second circumferential location 26, provides stability to the biasing member 22 while achieving the advantages described above.

The biasing member 22 may be in direct contact with the at least one vane lever 18, as shown in FIG. 2. However, it is to be appreciated that the biasing member 22 need not be in direct contact with the at least one vane lever 18. The biasing member 22 need only be in operable contact with the at least one vane lever 18. As such, there may be included an additional component(s) disposed between the biasing member 22 and the at least one vane lever 18 as long as the biasing member 22 is capable of biasing the at least one vane lever 18 toward the adjustment ring 16. Even with the embodiments having an additional component(s) disposed between the biasing member 22 and the at least one vane lever 18, vibration is reduced between the adjustment ring 16 and the at least one vane lever 18.

Although not required, as shown in FIG. 2, the biasing member 22 may extend from the first circumferential location 24 to the second circumferential location 26 circumferentially about a majority of the adjustment ring 16. The biasing member may be generally C-shaped. The biasing member 22 extending circumferentially about a majority of the adjustment ring 16 increases the stability of the biasing member 22 and allows the biasing member 22 to operably contact more than one vane 20. Alternatively, the biasing member 22 may extend from the first circumferential location 24 to the second circumferential location 26 only about a minority of the adjustment ring 16. In a non-limiting example, the first circumferential location 24 may be circumferentially spaced from the second circumferential location 26 such that only one vane lever 18 is disposed between the first circumferential location 24 and the second circumferential location 26. In another non-limiting example, the first circumferential location 24 may be circumferentially spaced from the second circumferential location 26 such that two, three, four, five, six, seven, eight, or more vane levers 18 are disposed between the first circumferential location 24 and the second circumferential location 26.

The biasing member 22 may be further defined as a wire spring, as shown in FIG. 2. It is to be appreciated, however, that the biasing member 22 may be a coil spring, a flat spring, a serpentine spring, a Belleville spring, a wave spring, or a spring washer, among other possibilities.

The biasing member 22 may include at least one planar portion 28 extending parallel to the adjustment ring 16 and at least one contact portion 30 extending axially away from the at least one planar portion 28 toward the at least one vane lever 18. The at least one contact portion 30 is operably in contact with the at least one vane lever 18. The at least one contact portion 30 of the biasing member 22 may be in direct contact with the at least one vane lever 18. However, it is to be appreciated that the at least one contact portion 30 of the biasing member 22 need not be in direct contact with the at least one vane lever 18. The at least one contact portion 30 of the biasing member 22 need only be in operable contact with the at least one vane lever 18. As such, there may be included an additional component(s) disposed between the at least one contact portion 30 of the biasing member 22 and the at least one vane lever 18 as long as the at least one contact portion 30 of the biasing member 22 is capable of biasing the at least one vane lever 18 toward the adjustment ring 16. Even with the embodiments having an additional component(s) disposed between the at least one contact portion 30 of the biasing member 22 and the at least one vane lever 18, vibration is reduced between the adjustment ring 16 and the at least one vane lever 18.

As shown in FIG. 2, the at least one contact portion 30 may be disposed between an adjacent pair of the planar portions 28. Moreover, the at least one contact portion 30 may be generally U-shaped. However, it is contemplated that the at least one contact portion 30 may alternatively be V-shaped or I-shaped.

Although not required, as shown in FIG. 2, the biasing member 22 may be coupled to the adjustment ring 16 at a third circumferential location 32 on the adjustment ring 16. The biasing member 22 may also be coupled to the adjustment ring 16 at a fourth circumferential location, a fifth circumferential location, or more circumferential locations. Additional circumferential locations at which the biasing member 22 is coupled to the adjustment ring 16 at increase the stability of the biasing member 22. Moreover, it is to be appreciate that the biasing member 22 may be fixed to the adjustment ring 16 at the first circumferential location 24 and the second circumferential location 26. Moreover, in the embodiments with the third circumferential location 32, the biasing member 22 may be fixed to the adjustment ring 16 at the third circumferential location 32. The biasing member 22 may also be fixed to the adjustment ring 16 at the fourth circumferential location, the fifth circumferential location, or more circumferential locations.

The at least one vane lever 18 may be further defined as a plurality of vane levers 18. Moreover, the at least one vane 20 may be further defined as a plurality of vanes 20. It is to be appreciated that the biasing member 22 may be operably in contact with at least two of the vane levers 18. Said differently, the biasing member 22 may be operably in contact with two of the vane levers 18, three of the vane levers 18, four of the vane levers 18, five of the vane levers 18, six of the vane levers 18, seven of the vane levers 18, eight of the vane levers 18, up to all of the vane levers 18 included in the variable turbine geometry assembly 10. Moreover, the biasing member 22 may be operably in contact with at least three of the vane levers 18. Said differently, the biasing member 22 may be operably in contact with three of the vane levers 18, four of the vane levers 18, five of the vane levers 18, six of the vane levers 18, seven of the vane levers 18, eight of the vane levers 18, up to all of the vane levers 18 included in the variable turbine geometry assembly 10.

As shown in FIG. 2, the variable turbine geometry assembly 10 may further include an adjustment projection 34 coupled to the adjustment ring 16 and extending axially away from the adjustment ring 16. The adjustment projection 34 may be disposed circumferentially between the first circumferential location 24 and the second circumferential location 26. The adjustment projection 34 may be coupled to an actuator configured to move the adjustment projection 34 to rotate the adjustment ring 16 about the axis A1 and move the at least one vane 20.

The at least one vane lever 18 may have a contact surface 36 facing away from the adjustment ring 16. The biasing member 22 may be operably in contact with the contact surface 36 of the at least one vane lever 18 to reduce vibration between the adjustment ring 16 and the at least one vane lever 18. The biasing member 22 may be in direct contact with the contact surface 36 of the at least one vane lever 18. However, it is to be appreciated that the biasing member 22 need not be in direct contact with the contact surface 36 of the at least one vane lever 18 to operably be in contact with the contact surface 36. As such, there may be included an additional component(s) disposed between the biasing member 22 and the contact surface 36 of the at least one vane lever 18. Even with the embodiments having an additional component(s) disposed between the biasing member 22 and the contact surface 36 of the at least one vane lever 18, vibration is reduced between the adjustment ring 16 and the at least one vane lever 18. Additionally, although not required, the contact surface 36 of the at least one vane lever 18 may be indented axially into the at least one vane lever 18 to seat the biasing member 22. Seating the biasing member 22 further increases the stability of the biasing member 22 relative to the adjustment ring 16.

The biasing member 22 may include at least one planar portion 28 extending parallel to the adjustment ring 16 and at least one contact portion 30 extending axially away from the at least one planar portion 28 toward the at least one vane lever 18. The at least one contact portion 30 of the biasing member 22 may be operably in contact with the contact surface 36 of the at least one vane lever 18. The at least one contact portion 30 of the biasing member 22 may be in direct contact with the contact surface 36 of the at least one vane lever 18. However, it is to be appreciated that the at least one contact portion 30 of the biasing member 22 need not be in direct contact with the contact surface 36 of the at least one vane lever 18 to operably be in contact with the contact surface 36. As such, there may be included an additional component(s) disposed between the at least one contact portion 30 of the biasing member 22 and the contact surface 36 of the at least one vane lever 18. Even with the embodiments having an additional component(s) disposed between the at least one contact portion 30 of the biasing member 22 and the contact surface 36 of the at least one vane lever 18, vibration is reduced between the adjustment ring 16 and the at least one vane lever 18.

Furthermore, as shown in FIG. 1, the turbocharger 14 may include the variable turbine geometry assembly 10 as shown in FIG. 2. The turbocharger 14 may include a shaft 38 extending along the axis A1 between a first shaft end 40 and a second shaft end 42 spaced from the first shaft end 40 along the axis A1. The turbocharger 14 may also include the turbine wheel 12 coupled to the first shaft end 40 of the shaft 38 and a compressor wheel 44 coupled to the second shaft end 42 of the shaft 38. The turbocharger 14 may further include a turbine housing 46 defining a turbine housing interior 48, with the turbine wheel 12 disposed in the turbine housing interior 48, and a compressor housing 50 defining a compressor housing interior 52, with the compressor wheel 44 disposed in the compressor housing interior 52.

Figure 3:
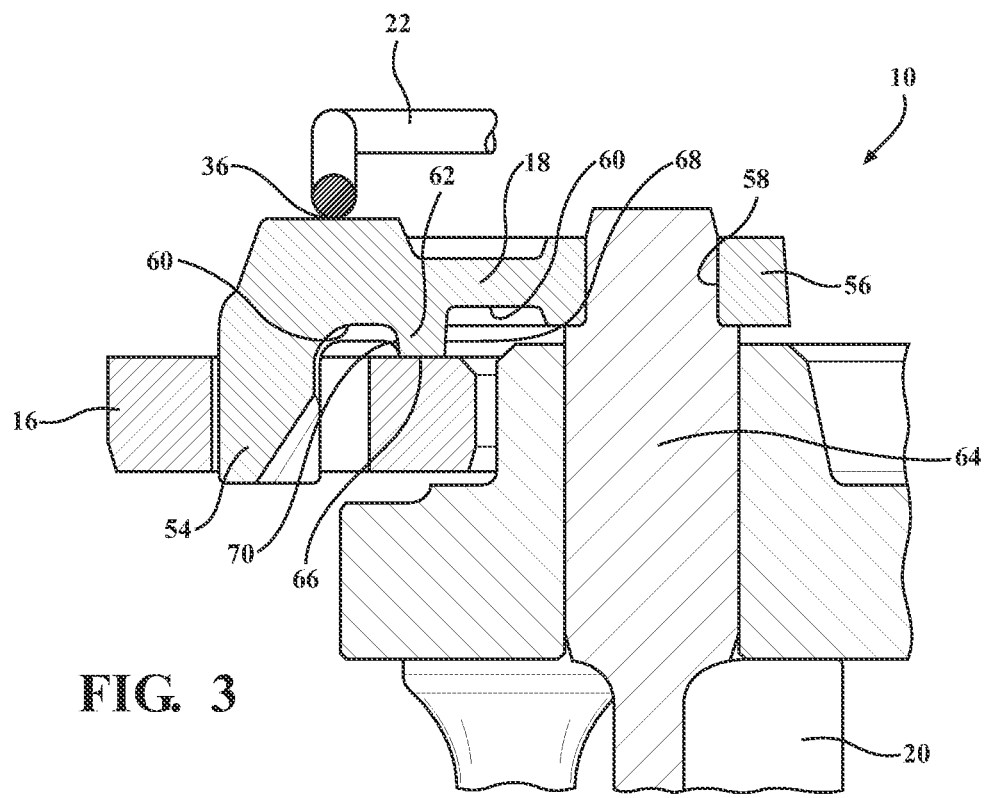
FIG. 3 is a cross-sectional view of the adjustment ring, the at least one vane lever, the at least one vane, and the biasing member, with the at least one vane lever including an axial stop.

In another embodiment, as shown in FIG. 3, the variable turbine geometry assembly 10 includes the adjustment ring 16 extending along and rotatable about the axis A1. The variable turbine geometry assembly 10 also includes the at least one vane lever 18 coupled to the adjustment ring 16. In the embodiment as shown in FIG. 3, the at least one vane lever 18 has a first lever end 54 coupled to the adjustment ring 16, a second lever end 56 defining a pin aperture 58, an inner lever surface 60 facing the adjustment ring 16 and extending parallel to the adjustment ring 16, and an axial stop 62 extending axially away from the inner lever surface 60 toward the adjustment ring 16 and configured to limit axial movement of the at least one vane lever 18. Although not required, the first lever end 54 may be fixed to adjustment ring 16. The variable turbine geometry assembly 10 in the embodiment as shown in FIG. 3 further includes a pin 64 disposed in the pin aperture 58 defined by the second lever end 56 of the at least one vane lever 18. Although not required, the second lever end 56 may be fixed to the pin 64. The variable turbine geometry assembly 10 further includes at least one vane 20 coupled to the pin 64, with the at least one vane 20 moveable with respect to the adjustment ring 16 when the adjustment ring 16 rotates about the axis A1. The variable turbine geometry assembly 10 further includes the biasing member 22 coupled to the adjustment ring 16 and operably in contact with the at least one vane lever 18 to bias the at least one vane lever 18 toward the adjustment ring 16 and to reduce vibration between the adjustment ring 16 and the at least one vane lever 18.

Accordingly, having the biasing member 22 operably in contact with the at least one vane lever 18 to bias the at least one vane lever 18 toward the adjustment ring 16 and to reduce vibration between the adjustment ring 16 and the at least one vane lever 18 reduces wear between various components of the variable turbine geometry assembly 10. More specifically, reduced vibration between the adjustment ring 16 and the at least one vane lever 18 reduces wear on the adjustment ring 16 and on the at least one vane lever 18. Reduced wear on the adjustment ring 16 and the at least one vane lever 18 further reduces noise, vibration, and harshness (NVH) of the turbocharger 14, as well as lowering the likelihood of functional failure of the variable turbine geometry assembly 10 adequately controlling flow of exhaust gas to the turbine wheel 12 of the turbocharger 14. Moreover, the at least one vane lever 18 including the axial stop 62 extending axially away from the inner lever surface 60 toward the adjustment ring 16 and configured to limit axial movement of the at least one vane lever 18 reduces relative distances between the at least one vane lever 18 and the adjustment ring 16, allowing the biasing member 22 to more easily reduce vibration, and thus wear, between the at least one vane lever 18 and the adjustment ring 16. Although not required, the axial stop 62 may have a first stop surface 66 facing the adjustment ring 16, a second stop surface 68 facing the axis A1, and a third stop surface 70 opposite the first stop surface 66 facing away from the axis A1.

It is to be appreciated that, in the embodiment as shown in FIG. 3, the biasing member 22 need not be limited to biasing member 22 as shown in FIG. 2. In a non-limiting example, the biasing member 22 may be two or more biasing members 22, each operably in contact with the at least one vane lever 18 to bias the at least one vane lever 18 toward the adjustment ring 16 and to reduce vibration between the adjustment ring 16 and the at least one vane lever 18.

However, it is also to be appreciated that the biasing member 22 as shown in FIG. 2 may be the same biasing member 22 as shown in FIG. 3 and as described herein. As such, although not required, the biasing member 22 may be coupled to the adjustment ring 16 at the first circumferential location 24 on the adjustment ring 16 and may be coupled to the adjustment ring 16 at the second circumferential location 26 different from the first circumferential location 24 on the adjustment ring 16. In this embodiment, the biasing member 22 extends from the first circumferential location 24 on the adjustment ring 16 to the second circumferential location 26 on the adjustment ring 16. The biasing member 22 may be operably in contact with the at least one vane lever 18 between the first circumferential location 24 and the second circumferential location 26 to bias the at least one vane lever 18 toward the adjustment ring 16 and to reduce vibration between the adjustment ring 16 and the at least one vane lever 18.

Moreover, in the embodiment as shown in FIG. 3, the biasing member 22 may be in direct contact with the at least one vane lever 18. However, it is to be appreciated that the biasing member 22 need not be in direct contact with the at least one vane lever 18. The biasing member 22 need only be in operable contact with the at least one vane lever 18. As such, there may be included an additional component(s) disposed between the biasing member 22 and the at least one vane lever 18 as long as the biasing member 22 is capable of biasing the at least one vane lever 18 toward the adjustment ring 16. Even with the embodiments having an additional component(s) disposed between the biasing member 22 and the at least one vane lever 18, vibration is reduced between the adjustment ring 16 and the at least one vane lever 18.

Additionally, although not required, in the embodiment as shown in FIG. 3, the biasing member 22 may extend from the first circumferential location 24 to the second circumferential location 26 circumferentially about a majority of the adjustment ring 16. The biasing member may be generally C-shaped. The biasing member 22 extending circumferentially about a majority of the adjustment ring 16 increases the stability of the biasing member 22 and allows the biasing member 22 to operably contact more than one vane 20. Alternatively, the biasing member 22 may extend from the first circumferential location 24 to the second circumferential location 26 only about a minority of the adjustment ring 16. In a non-limiting example, the first circumferential location 24 may be circumferentially spaced from the second circumferential location 26 such that only one vane lever 18 is disposed between the first circumferential location 24 and the second circumferential location 26. In another non-limiting example, the first circumferential location 24 may be circumferentially spaced from the second circumferential location 26 such that two, three, four, five, six, seven, eight, or more vane levers 18 are disposed between the first circumferential location 24 and the second circumferential location 26.

The biasing member 22 as shown in FIG. 3 may be further defined as the wire spring. It is to be appreciated, however, that the biasing member 22 may be the coil spring, the flat spring, the serpentine spring, the Belleville spring, the wave spring, or the spring washer, among other possibilities.

Moreover, in the embodiment as shown in FIG. 3, the biasing member 22 may include at least one planar portion 28 extending parallel to the adjustment ring 16 and at least one contact portion 30 extending axially away from the at least one planar portion 28 toward the at least one vane lever 18. The at least one contact portion 30 is operably in contact with the at least one vane lever 18. The at least one contact portion 30 of the biasing member 22 may be in direct contact with the at least one vane lever 18. However, it is to be appreciated that the at least one contact portion 30 of the biasing member 22 need not be in direct contact with the at least one vane lever 18. The at least one contact portion 30 of the biasing member 22 need only be in operable contact with the at least one vane lever 18. As such, there may be included an additional component(s) disposed between the at least one contact portion 30 of the biasing member 22 and the at least one vane lever 18 as long as the at least one contact portion 30 of the biasing member 22 is capable of biasing the at least one vane lever 18 toward the adjustment ring 16. Even with the embodiments having an additional component(s) disposed between the at least one contact portion 30 of the biasing member 22 and the at least one vane lever 18, vibration is reduced between the adjustment ring 16 and the at least one vane lever 18.

Moreover, in the embodiment as shown in FIG. 3, the at least one contact portion 30 may be disposed between an adjacent pair of the planar portions 28. Moreover, the at least one contact portion 30 may be generally U-shaped. However, it is contemplated that the at least one contact portion 30 may alternatively be V-shaped or I-shaped.

Although not required, in the embodiment as shown in FIG. 3, the biasing member 22 may be coupled to the adjustment ring 16 at the third circumferential location 32 on the adjustment ring 16. The biasing member 22 may also be coupled to the adjustment ring 16 at the fourth circumferential location, the fifth circumferential location, or more circumferential locations. Additional circumferential locations at which the biasing member 22 is coupled to the adjustment ring 16 at increase the stability of the biasing member 22. Moreover, it is to be appreciate that the biasing member 22 may be fixed to the adjustment ring 16 at the first circumferential location 24 and the second circumferential location 26. Moreover, in the embodiments with the third circumferential location 32, the biasing member 22 may be fixed to the adjustment ring 16 at the third circumferential location 32. The biasing member 22 may also be fixed to the adjustment ring 16 at the fourth circumferential location, the fifth circumferential location, or more circumferential locations.

Additionally, in the embodiment as shown in FIG. 3, the at least one vane lever 18 may be further defined as the plurality of vane levers 18. Moreover, the at least one vane 20 may be further defined as the plurality of vanes 20. It is to be appreciated that the biasing member 22 of the embodiment as shown in FIG. 3 may be operably in contact with at least two of the vane levers 18. Said differently, the biasing member 22 may be operably in contact with two of the vane levers 18, three of the vane levers 18, four of the vane levers 18, five of the vane levers 18, six of the vane levers 18, seven of the vane levers 18, eight of the vane levers 18, up to all of the vane levers 18 included in the variable turbine geometry assembly 10. Moreover, the biasing member 22 may be operably in contact with at least three of the vane levers 18. Said differently, the biasing member 22 may be operably in contact with three of the vane levers 18, four of the vane levers 18, five of the vane levers 18, six of the vane levers 18, seven of the vane levers 18, eight of the vane levers 18, up to all of the vane levers 18 included in the variable turbine geometry assembly 10.

Although not shown in FIG. 3, it is to be appreciated that the variable turbine geometry assembly 10 of the embodiment as shown in FIG. 3 may further include an adjustment projection 34 coupled to the adjustment ring 16 and extending axially away from the adjustment ring 16. The adjustment projection 34 may be disposed circumferentially between the first circumferential location 24 and the second circumferential location 26. The adjustment projection 34 may be coupled to an actuator configured to move the adjustment projection 34 to rotate the adjustment ring 16 about the axis A1 and move the at least one vane 20.

Further, the at least one vane lever 18 of the embodiment as shown in FIG. 3 may have the contact surface 36 facing away from the adjustment ring 16. The biasing member 22 may be operably in contact with the contact surface 36 of the at least one vane lever 18 to reduce vibration between the adjustment ring 16 and the at least one vane lever 18. The biasing member 22 may be in direct contact with the contact surface 36 of the at least one vane lever 18. However, it is to be appreciated that the biasing member 22 need not be in direct contact with the contact surface 36 of the at least one vane lever 18 to operably be in contact with the contact surface 36. As such, there may be included an additional component(s) disposed between the biasing member 22 and the contact surface 36 of the at least one vane lever 18. Even with the embodiments having an additional component(s)

disposed between the biasing member 22 and the contact surface 36 of the at least one vane lever 18, vibration is reduced between the adjustment ring 16 and the at least one vane lever 18. Additionally, although not required, in the embodiment as shown in FIG. 3, the contact surface 36 of the at least one vane lever 18 may be indented axially into the at least one vane lever 18 to seat the biasing member 22. Seating the biasing member 22 further increases the stability of the biasing member 22 relative to the adjustment ring 16.

Moreover, it is to be appreciated that the biasing member 22 of the embodiment as shown in FIG. 3 may include at least one planar portion 28 extending parallel to the adjustment ring 16 and at least one contact portion 30 extending axially away from the at least one planar portion 28 toward the at least one vane lever 18. The at least one contact portion 30 of the biasing member 22 may be operably in contact with the contact surface 36 of the at least one vane lever 18. The at least one contact portion 30 of the biasing member 22 may be in direct contact with the contact surface 36 of the at least one vane lever 18. However, it is to be appreciated that the at least one contact portion 30 of the biasing member 22 need not be in direct contact with the contact surface 36 of the at least one vane lever 18 to operably be in contact with the contact surface 36. As such, there may be included an additional component(s) disposed between the at least one contact portion 30 of the biasing member 22 and the contact surface 36 of the at least one vane lever 18. Even with the embodiments having an additional component(s) disposed between the at least one contact portion 30 of the biasing member 22 and the contact surface 36 of the at least one vane lever 18, vibration is reduced between the adjustment ring 16 and the at least one vane lever 18.

Furthermore, as shown in FIG. 1, the turbocharger 14 may include the variable turbine geometry assembly 10 as shown in FIG. 3. The turbocharger 14 may include the shaft 38 extending along the axis A1 between the first shaft end 40 and the second shaft end 42 spaced from the first shaft end 40 along the axis A1. The turbocharger 14 may also include the turbine wheel 12 coupled to the first shaft end 40 of the shaft 38 and the compressor wheel 44 coupled to the second shaft end 42 of the shaft 38. The turbocharger 14 may further include the turbine housing 46 defining the turbine housing interior 48, with the turbine wheel 12 disposed in the turbine housing interior 48, and the compressor housing 50 defining the compressor housing interior 52, with the compressor wheel 44 disposed in the compressor housing interior 52.

In another embodiment, the variable turbine geometry assembly 10 includes the adjustment ring 16 extending along and rotatable about the first axis A1. The variable turbine geometry assembly 10 also includes at least one vane lever 18 coupled to the adjustment ring 16 and the variable turbine geometry assembly 10 includes at least one vane 20 coupled to the at least one vane lever 18. The at least one vane 20 is moveable with respect to the adjustment ring 16 when the adjustment ring 16 rotates about the first axis A1. The at least one vane 20 has a first vane surface 72 facing the first axis A1, and a second vane surface 74 opposite the first vane surface 72 and facing away from the first axis A1. The at least one vane 20 further has a third vane surface 76 facing the adjustment ring 16, and a fourth vane surface 78 opposite the third vane surface 76 and facing away from the adjustment ring 16. The first vane surface 72 of the at least one vane 20 has a discontinuous region 80. The discontinuous region 80 extends along a second axis A2 from a first region end 82 to a second region end 84 spaced from the first region end 82 along the second axis A2. The second axis A2 is obliquely angled relative to the first axis A1 to impart an aerodynamic load to the at least one vane 20.

Accordingly, the aerodynamic load imparted on the at least one vane 20 by the discontinuous region 80 biases the at least one vane 20 in a particular rotational direction to reduce flutter of the at least one vane 20. Reduced flutter of the at least one vane 20 reduces vibration between the at least one vane 20 and the at least one vane lever 18 and the adjustment ring 16, which in turn reduces wear between various components of the variable turbine geometry assembly 10. More specifically, reduced vibration between the at least one vane 20 and the at least one vane lever 18 and the adjustment ring 16 reduces wear on the at least one vane 20, the at least one vane lever 18, and the adjustment ring 16. Reduced wear on the at least one vane 20, the at least one vane lever 18, and the adjustment ring 16 further reduces noise, vibration, and harshness (NVH) of the turbocharger 14, as well as lowering the likelihood of functional failure of the variable turbine geometry assembly 10 adequately controlling flow of exhaust gas to the turbine wheel 12 of the turbocharger 14.

Although not required, the first region end 82 may be axially offset from the second region end 84 such that the first region end 82 is spaced from the second region end 84 along the first axis A1. Moreover, it is to be appreciated that the discontinuous region 80 may extend away from the first vane surface 72 of the at least one vane 20. In other words, the discontinuous region 80 may be a projection such as a fin. Alternatively, it is to be appreciated that the discontinuous region 80 may be indented into the first vane surface 72 of the at least one vane 20. In other words, the discontinuous region 80 may be a groove, channel, or other void. It is also to be appreciate that the discontinuous region 80 may have portion(s) that extend away from the first vane surface 72 (i.e., are projection(s) such as a fin) while the discontinuous region 80 may also have portion(s) that are indented into the first vane surface 72 (i.e., are a groove, channel, or other void).

Figure 4:
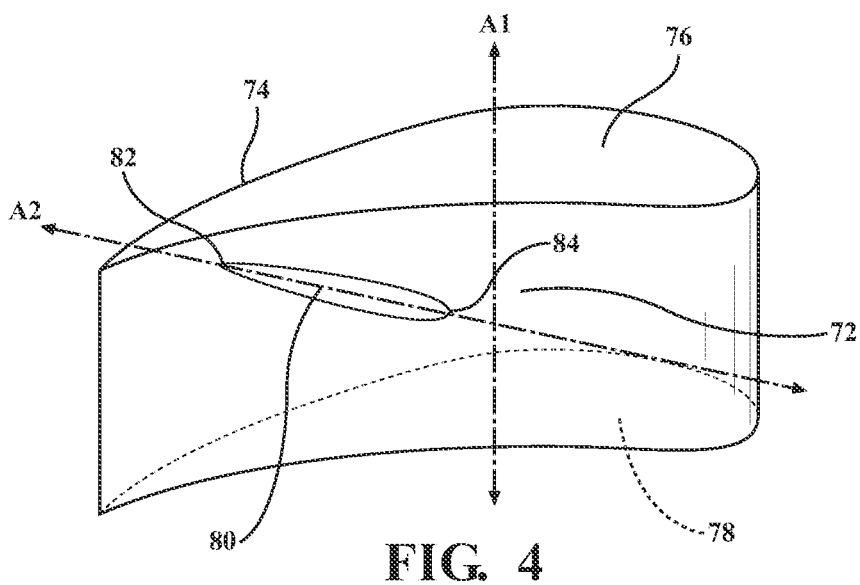
FIG. 4 is perspective view partially in phantom of the at least one vane, with the at least one vane having a discontinuous region.

Although not required, it is to be appreciated that the at least one vane 20 of the embodiment as shown in FIG. 4 may be used in combination with the variable turbine geometry assembly 10 as shown in FIG. 2 and the variable turbine geometry assembly 10 as shown in FIG. 3.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A variable turbine geometry assembly for controlling flow of exhaust gas to a turbine wheel of a turbocharger, said variable turbine geometry assembly comprising:

an adjustment ring extending along and rotatable about an axis;

at least one vane lever coupled to said adjustment ring;

at least one vane coupled to said at least one vane lever, with said at least one vane moveable with respect to said adjustment ring when said adjustment ring rotates about said axis; and a biasing member,
coupled to said adjustment ring at a first circumferential location on said adjustment ring,
coupled to said adjustment ring at a second circumferential location different from said first circumferential location on said adjustment ring, extending from said first circumferential location on said adjustment ring to said second circumferential location on said adjustment ring, and operably in contact with said at least one vane lever between said first circumferential location and said second circumferential location to bias said at least one vane lever toward said adjustment ring and to reduce vibration between said adjustment ring and said at least one vane lever.

2. The variable turbine geometry assembly as set forth in claim 1, wherein said biasing member is in direct contact with said at least one vane lever.

3. The variable turbine geometry assembly as set forth in claim 1, wherein said biasing member extends from said first circumferential location to said second circumferential location circumferentially about a majority of said adjustment ring.

4. The variable turbine geometry assembly as set forth in claim 1, wherein said biasing member includes at least one planar portion extending parallel to said adjustment ring and at least one contact portion extending axially away from said at least one planar portion toward said at least one vane lever, said at least one contact portion operably in contact with said at least one vane lever.

5. The variable turbine geometry assembly as set forth in claim 4, wherein said at least one contact portion is disposed between an adjacent pair of said planar portions.

6. The variable turbine geometry assembly as set forth in claim 4, wherein said at least one contact portion is generally U-shaped.

7. The variable turbine geometry assembly as set forth in claim 1, wherein said biasing member is coupled to said adjustment ring at a third circumferential location on said adjustment ring.

8. The variable turbine geometry assembly as set forth in claim 1, wherein said at least one vane lever is further defined as a plurality of vane levers, wherein said at least one vane is further defined as a plurality of vanes, and wherein said biasing member is operably in contact with at least two of said vane levers.

9. The variable turbine geometry assembly as set forth in claim 1, wherein said at least one vane lever is further defined as a plurality of vane levers, wherein said at least one vane is further defined as a plurality of vanes, and wherein said biasing member is operably in contact with at least three of said vane levers.

10. The variable turbine geometry assembly as set forth in claim 1, wherein said variable turbine geometry assembly further comprises an adjustment projection coupled to said adjustment ring and extending axially away from said adjustment ring, and wherein said adjustment projection is disposed circumferentially between said first circumferential location and said second circumferential location.

11. The variable turbine geometry assembly as set forth in claim 1, wherein said biasing member is further defined as a wire spring.

12. The variable turbine geometry assembly as set forth in claim 1, wherein said at least one vane lever has a contact surface facing away from said adjustment ring, and wherein said biasing member is operably in contact with said contact surface to reduce vibration between said adjustment ring and said at least one vane lever.

13. The variable turbine geometry assembly as set forth in claim 12, wherein said contact surface of said at least one vane lever is indented axially into said at least one vane lever to seat said biasing member.

14. The variable turbine geometry assembly as set forth in claim 12, wherein said biasing member includes at least one planar portion extending parallel to said adjustment ring and at least one contact portion extending axially away from said at least one planar portion toward said at least one vane lever, said at least one contact portion of said biasing member operably in contact with said contact surface of said at least one vane lever.

15. A turbocharger comprising said variable turbine geometry assembly as set forth in claim 1 and further comprising, a shaft extending along said axis between a first shaft end and a second shaft end spaced from said first shaft end along said axis;

a turbine wheel coupled to said first shaft end of said shaft;

a compressor wheel coupled to said second shaft end of said shaft; and a turbine housing defining a turbine housing interior, with said turbine wheel disposed in said turbine housing interior.

* * * * *